United States Patent [19]

Lüchinger

[11] 4,043,415
[45] Aug. 23, 1977

[54] PRECISION BALANCE WITH PAN ASSEMBLY GUIDED BY PARALLELOGRAM LINKAGE HAVING TWO FLEXIBLE MEMBERS

[75] Inventor: Paul Lüchinger, Greifensee, Switzerland

[73] Assignee: Mettler Instrumente AG, Greifensee-Zurich, Switzerland

[21] Appl. No.: 699,492

[22] Filed: June 24, 1976

[30] Foreign Application Priority Data
Oct. 10, 1975 Switzerland ............... 13207/75

[51] Int. Cl.$^2$ .................................... G01G 21/24
[52] U.S. Cl. ........................... 177/255; 177/168; 177/229
[58] Field of Search ............... 177/212, 229, 210 C, 177/210 EM, 255, 168, 230

[56] References Cited
U.S. PATENT DOCUMENTS

| | | | |
|---|---|---|---|
| 3,519,095 | 7/1970 | Tomes | 177/212 X |
| 3,847,238 | 11/1974 | Hall | 177/255 |

Primary Examiner—Joseph W. Hartary
Attorney, Agent, or Firm—Hans Berman

[57] ABSTRACT

A precision balance in which the weighing pan assembly is connected to the stationary supporting structure of the balance by two flexible links in a parallelogram configuration is equipped with coarse adjustment and fine adustment for the connected end of one of the links to ensure parallel elongation of the links.

10 Claims, 7 Drawing Figures

PRECISION BALANCE WITH PAN ASSEMBLY GUIDED BY PARALLELOGRAM LINKAGE HAVING TWO FLEXIBLE MEMBERS

This invention relates to precision balances, and particularly to a precision balance in which a weighing pan assembly is connected to the stationary supporting structure of the balance by two flexible, elongated links in a parallelogram configuration which restricts the weighing pan assembly to a path of movement having a predominant vertical component.

As is well known in itself, the precision of the weighings capable of being obtained on a balance of the type described depends greatly on the parallel position of the two links, and particularly on an even vertical spacing of the link ends on the supporting structure and on the weighing pan assembly. If the two spacings are uneven, the weight indicated by the balance may be incorrect if the weighing pan is loaded off-center. Devices suitable for adjusting the positions and end spacings of the links are known, for example, from U.S. Pat. No. 3,847,238.

The known devices, however, permit only a relatively coarse adjustment of the link ends to the nearest tenth of a millimeter, or at best to several hundredths of a millimeter. Such adjustment is adequate for the determination of weight to four or at most five significant digits, but does not permit more precise weight determination.

It is a primary object of this invention to permit a finer adjustment of the flexible links in the afore-described type of balance, and thereby to enhance the range and/or the precision of the weighings capable of being performed on such a balance.

In one of its aspects, the invention thus resides in a balance of the type described which is equipped not only with a coarse adjustment of at least one of the link ends, but also with a fine adjustment. The adjusting mechanism of the invention includes a first adjusting member and a second adjusting member which members are mounted on the support assembly of the balance for movement by manual operation. First and second motion transmitting trains respectively are interposed between the adjustment members and at least one end portion of a link for moving the associated end portion in response to movement of the associated adjusting member. The movement of the end portion associated with the first motion transmitting train in response to a movement of predetermined magnitude of the first adjusting member is greater, and the adjustment thus coarser, than the movement of the end portion associated with the second motion transmitting train in response to a movement of the second adjusting member of a magnitude identical with the predetermined magnitude of the first adjusting member.

Other features, additional objects, and many of the attendant advantages of this invention will readily be appreciated as the same becomes better understood by reference to the following detailed description of a preferred embodiment when considered in connection with the appended drawing in which.

Figure 1:
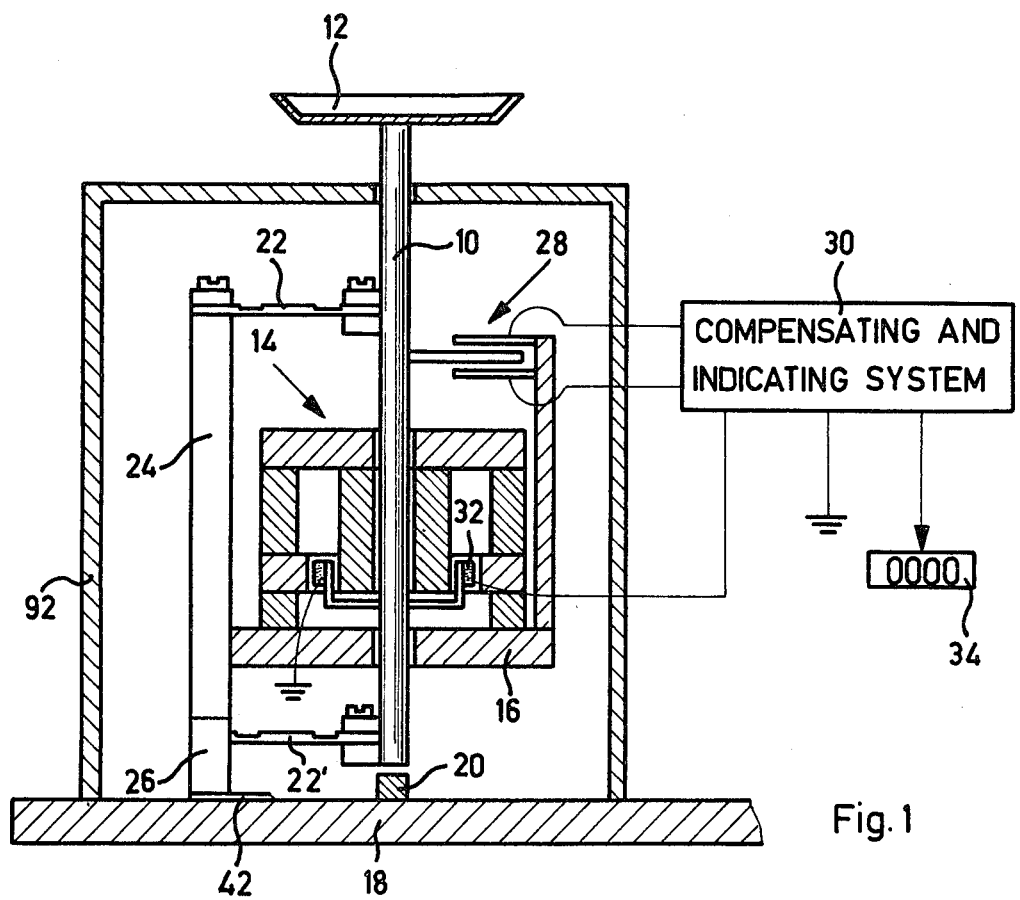
FIG. 1 shows a balance of the invention in simplified, front-elevational section.

Referring now to the drawing in detail, and initially to FIG. 1, there is shown only as much of a balance of the general type known from Patent No. 3,519,095 as is necessary for an understanding of the invention.

A cylindrical upright bar 10 is the carrier for a weighing pan 12. The top end of the bar 10 and the pan 12 are located outside a housing 92. The bar 10 passes through an opening in a permanent magnet 14 mounted on a bracket 16 which is an element of the stationary support structure of the balance. An abutment 20 on the base plate 18 of the support structure limits downward movement of the bar 10.

Two links 22, 22' are horizontally elongated in the illustrated condition of the balance. A first end portion of each link 22, 22' is secured to the base plate 18, the link 22 being fixedly attached to an upright wall member 24 fixed on the base plate 18 from which the aforementioned bracket 16 projects. The first end portion of the link 22' is connected to the base plate 18 by an adjusting device 26 supported on a mounting plate 42 and not capable of detailed representation on the scale of FIG. 1.

The vertical position of the rod 10 is sensed by a capacitor arrangement 28 in a known manner, one plate of the arrangement mounted on the rod 10 being received between two vertically spaced plates fixedly mounted on the bracket 16 and conductively connected to a compensating and indicating system 30 which is also connected to a coil 32 attached to the rod 10 and movable in the air gap of the magnet 14. The current supplied to the coil 32 by the compensating system 30 lifts the weighing pan assembly 10, 12 and a non-illustrated load on the pan 12 to a base position sensed by the capacitor arrangement 28. The current fed to the coil 32 which is necessary for restoring the base position is related in a known manner with the weight on the pan 12 so that a galvanometer 34 on the compensating system 30 may indicate the weight to be measured as is known in itself.

Figure 2:
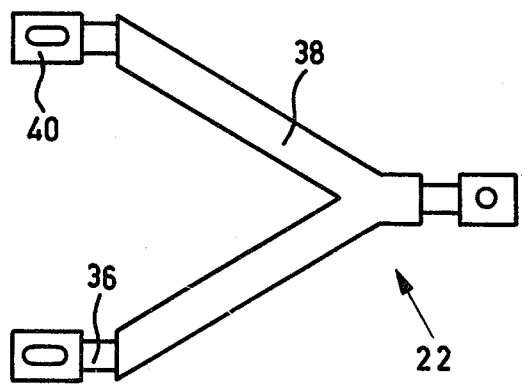
FIG. 2 shows a link in the balance of FIG. 1 in enlarged top plan view.

As is shown in FIG. 2 with specific reference to the link 22, the two identical links 22, 22' Y-shaped elements made from spring-temper steel or bronze sheet of originally uniform thickness. The transverse width of each arm 38 of the Y-shape is equal to that of the short stem from which the arms diverge. The free ends 40 of the arms 38 are slotted, and the free end of the stem is also apertured for receiving a fastening screw. Adjacent the free ends, the arms and the stem have each a portion 36 of reduced width and thickness and thus greater transverse flexibility.

The free ends 40 of the two arms 38 of the link 22 are fixedly bolted to the fixed wall member 24, and the free end of the stem is similarly bolted to the rod 10. The stem of the link 22' is bolted to the weighing pan assembly 10, 12, but the two free ends 40 are connected to the base plate 18 by respective adjusting devices 26 which are mirror images of each other and of which only one is seen in the drawing, particularly in FIGS. 3 to 7.

Each adjusting device is mounted on a plate 42 which in turn is attached to the base plate 18 in a conventional manner, not shown. A cylindrical column 44 vertically projects from the mounting plate 42 into a conforming recess in a generally rectangular, prismatic block 46. When a clamping screw 48 is loosened, the block 46 may slide on the column 44. As is better seen in FIG. 5, the column 44 partly extends into a bore 52 of the block 46 in which the screw 48 is received with ample clearance. The screw 48 passes freely through a sleeve 51 and threadedly engages a nut 50, the sleeve and nut being guided in the bore 52 and beveled for clamping area contact with the column 44 when the screw 48 is tightened.

The top of the block 46 is vertically slotted, and one end of a lever 54 is movably received in the slot. A free end 40 of the link 22' is attached to the lever 54 by a spacer 56 dimensioned to minimize lateral movement of the lever 54 and by a screw 58. The bottom of the block 46 rests on the arms 60 of a forked, or Y-shaped rocker, best seen in FIG. 6, whose stem 62 is apertured and abuts against the head of an adjusting screw 64 threadedly mounted on the plate 42. A bend in the rocker, approximately equidistant from the screw 64 and the points of engagement with the block 46, pivotally engages the plate 42 so that the block 46 may be raised by turning the screw 64 while the clamping screw 48 is released or lowered manually to a desired position defined by the adjusting screw 64.

Lateral upright flanges on the lever 54 in the slot of the block 46 are formed with upwardly open V-notches 66 into which coaxial pivot pins 68 project from the block 46. The pins are axially adjustably secured in bores of the block 46 by set screws 70, as is better seen in FIG. 4, and have shoulders engaging the flanges of the lever 54 for lateral guidance. The vertical axes of two helical compression springs 69 intersect the common axis of the pivot pins 68. The springs 69 are partly recessed in the block 46 and abut against the lever 54 from below to maintain pivotal contact between the flanges of the lever and the pins 68. The fulcrum or pivot axis of the lever 54 is thus near the free end 40 of the link 22' and passes close to the end of the reduced arm portion 36 remote from the free end 40. Flexing of the links 22, 22' occurs mainly in the centers of the reduced portions 36 where flexibility is at a maximum.

Figure 3:
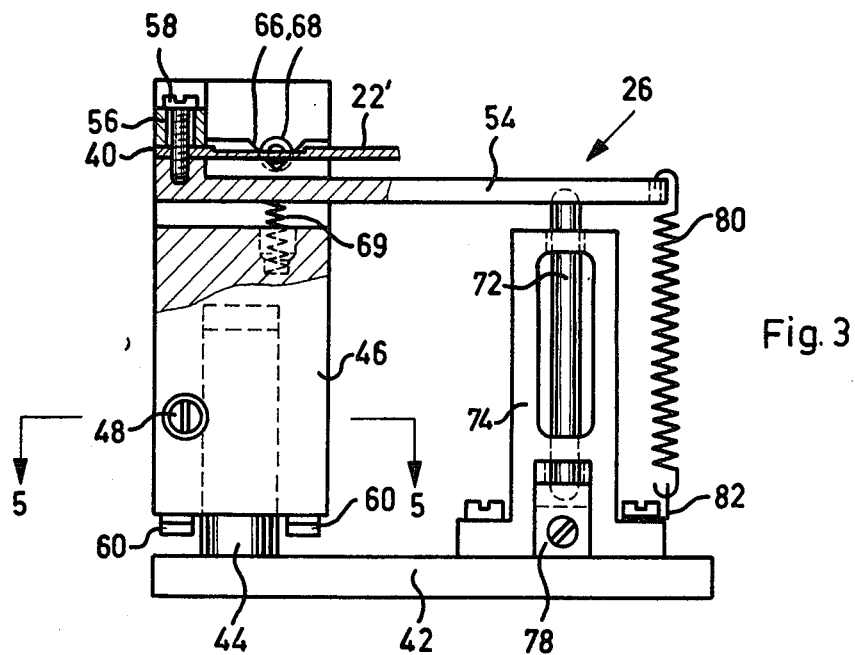
FIG. 3 shows an adjustable link support in the balance of FIG. 1 on a larger scale and partly in section on line 3 — 3 (FIG. 4)
Figure 4:
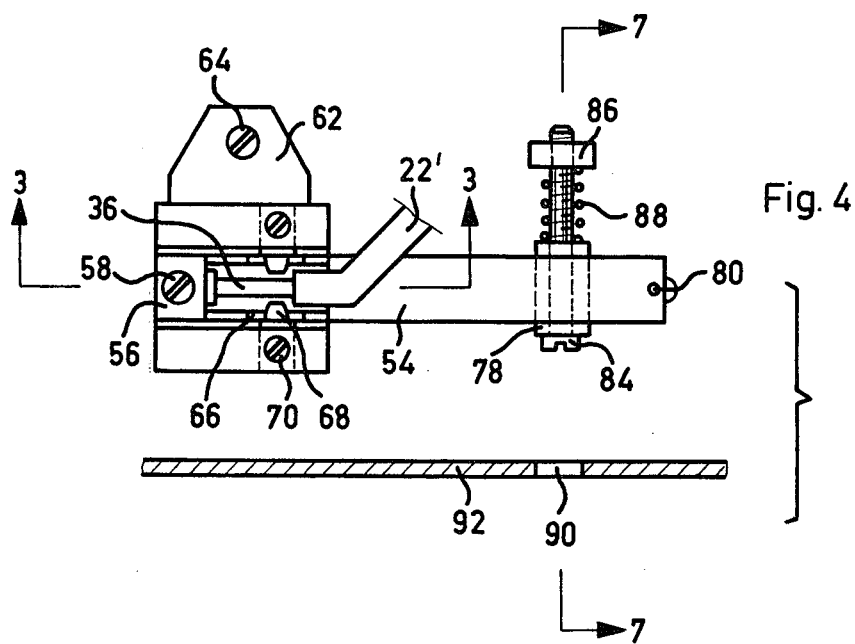
FIG. 4 illustrates elements of the device of FIG. 3 in top plan view.
Figure 5:
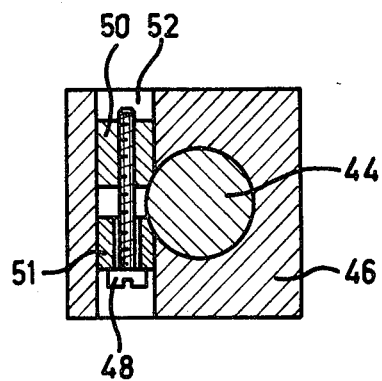
FIG. 5 is a fragmentary view of the device of FIG. 3 taken in section on the line 5 — 5.
Figure 6:
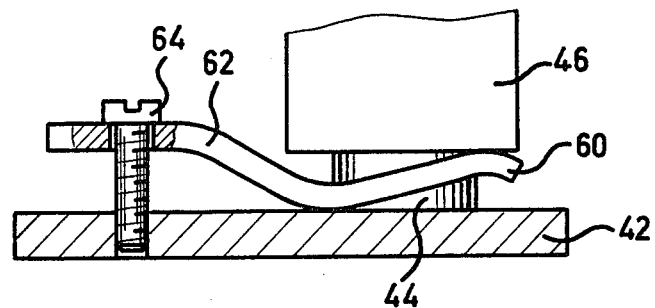
FIG. 6 shows a portion of the apparatus of FIG. 3 in side elevation.
Figure 7:
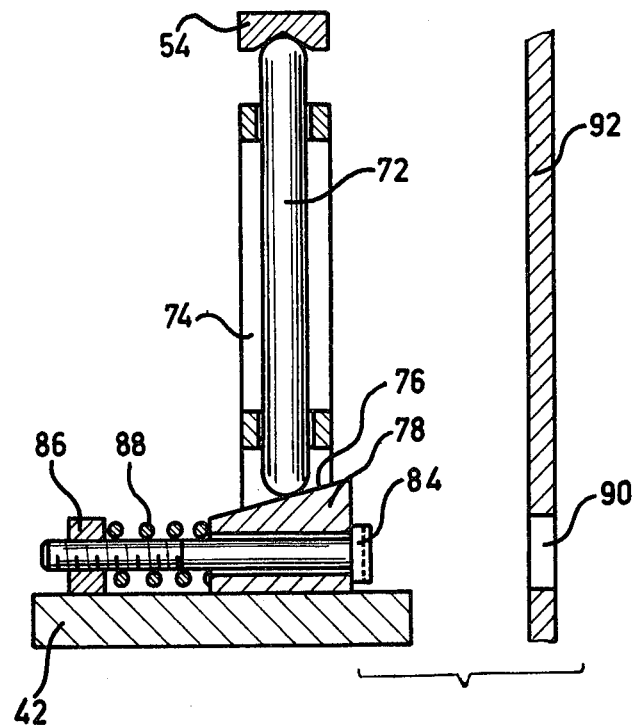
FIG. 7 illustrates the device of FIG. 3 in a section corresponding to the line 7 — 7 in FIG. 4.

The long arm of the lever 54 rests on the rounded top end of a rod 72 movably secured in a vertical position by two guide brackets 74 bolted to the plate 42 as is best seen in FIGS. 3 and 7, the brackets having omitted from FIG. 4. The bottom end of the rod 72 rests on the obliquely sloping top face 76 of a wedge-shaped slide 78 whose horizontal movement on the surface of the mounting plate 42 is also guided by the brackets 74. The ends of a helical tension spring 80 are hooked into an opening on the long arm of the lever 54 and an eye 82 attached to a bracket 74 to maintain engagement between the lever and the rod 72. The head of a partly threaded adjusting spindle 84 freely passing through a horizontal bore in the slide 84 abuts against the slide, and its threaded shank portion is matingly received in a nut 86 fixedly attached to the mounting plate 42. A helical compression spring 88 coiled about the shank of the spindle 84 biases the slide 78 away from the nut 86. An opening 90 in the balance housing 92 is axially aligned with the head of the spindle 84 so that the spindle may be turned, the slide 84 shifted horizontally, and the rod 72 shifted vertically by means of a screw driver inserted into the balance housing 92 through the opening 90.

When the parallelogram constituted by the carrier bar 10, the links 22, 22' and elements of the supporting structure is first assembled in the shop of the balance maker, the effective lengths of the four link arms 38 are set with adequate precision by shifting fastening screws in the slotted ends 40. The effective length of the parallelogram side constituted by the carrier bar 10 is fixed. The length of the parallelogram side constituted by the supporting structure is adjusted after assembly.

A coarse adjustment is made prior to installation of the housing 92 by turning each of the two adjusting screws 64 after release of the associated column 44 from the block 46 by the clamping screw 48 and by thereafter again fixing the adjusted position of the block 46. The ends 40 of the link 22' are so closely adjacent the block 46 as to be moved vertically over approximately the same distance as the common axis of the pins 68 is shifted by the adjusting screw 64.

After installation of the housing 92, a further fine adjustment is made by turning the adjusting spindle 84. Because the top face of the slide 78 is inclined relative to the horizontal at an angle of less than 45°, the rod 72 moves vertically at a lower rate than the simultaneous rate of horizontal slide movement. The area of engagement between the rod 72 and the lever 54 is relatively far from the pivot pins 68 so that the free end 40 of the link 22' is moved vertically only a small fraction of the distance over which the adjusting spindle 84 moves axially in the nut 86.

The motion transmitting trains respectively connecting a screw 64 and a spindle 84 with each free end 40 of the link 22' thus have very different transmission ratios so that, for identical angular movements of the screw 64 and the spindle 84, much greater vertical movement of the link end 40 is caused by the screw 64 than by the spindle 84 regardless of any practical difference in pitch that may exist between the respective screw threads, and the threads are chosen either equal in pitch or to enhance the difference in transmission ratio.

The changes in vertical spacing of corresponding ends of the links 22, 22' brought about by the screw 64 and associated elements are at least of the order of a tenth of a millimeter so that effects of ambient temperature variation and air movement are unimportant. The spindle 84 permits adjustment to less than one thousandth of a millimeter and is of the same order of magnitude as the length changes in the long members of the parallelogram suspension brought about by the heat radiated from a closely adjacent human body. The balance housing 92 which need not be removed for fine adjustment of the link 22' safely eliminates external influences potentially vitiating the benefits of fine adjustment which is preferably made or repeated after installation of the balances at the ultimate user's place of work.

If the balance is to be operated at greatly varying temperatures, the material of the rod 72 may be chosen for compensating differences in thermal expansion between other elements of the balance, for example, between the assembly of supporting elements and the weighing pan assembly 10, 12.

The invention is particularly effective in enhancing the sensitivity and precision of balances in which the vertical movement of the weighing pan assembly is very small, and the assembly is returned to a base position regardless of the load, as in the illustrated balance with electromagnetic compensation. An actual embodiment of the illustrated balance has been found to have a sensitivity of 0.1 mg over a range from 0 to 200 g. The benefits of the separate coarse and fine adjustments of the parallelogram suspension of a balance relying on flexible links, however, are available at least to some extent in balances in which the weighing pan moves over a vertical path in proportion to the applied load.

Forked links are preferred because of the superior guidance provided to the weighing pan assembly, but the invention is not limited to the specific shape of the links in the parallelogram configuration.

In the illustrated embodiment of the invention, the adjusting screw 64 and the adjusting spindle 84 are connected by respective motion transmitting trains to the same free end 40 of the link 22' for coarse and fine adjustment of the connected link, and such an arrangement is preferred because it permits the entire adjusting mechanism to be mounted on a single plate 42 and installed as a unit while the other link ends are mounted in a simple manner. However, the two motion transmitting trains may connect the screw 64 and the spindle 84 to the arms 38 and to the stem respectively of the same link, or to free end portions of two different links, without significant change in the mode of adjusting operation.

While pivot pins 68 have been shown to connect the block 46 to the lever 54, other connections permitting relative angular movement, such as flexible bands of the type used in the bearings of balance beams, may be employed in an obvious manner.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A precision balance comprising:
   a. a support assembly;
   b. a weighing pan assembly;
   c. guide means for guiding said weighing pan assembly relative to said support assembly in a path of movement having a predominant vertical component when said balance is in the operating position thereof, said guide means including
      1. two elongated, transversely flexible link members transversely spaced in a vertical direction,
      2. each link member having a first end portion secured to said support assembly and a second end portion secured to said weighing pan assembly; and
   d. adjusting means for moving at least one of said link members toward and away from a position in which the respective directions of elongation of said link members are parallel, said adjusting means including
      1. a first adjusting member and a second adjusting member, said adjusting members being mounted on said support assembly for movement by manual operation,
      2. first and second motion transmitting means respectively interposed between said first and second adjusting members and said at least one end portion for moving the associated end portion in response to movement of the associated adjusting member,
      3. the movement of the end portion associated with said first motion transmitting means in response to a movement of predetermined magnitude of said first adjusting member being greater than the movement of the end portion associated with said second motion transmitting means in response to a movement of said second adjusting member of a magnitude identical with said predetermined magnitude.

2. A balance as set forth in claim 1, wherein said first and second motion transmitting means are associated with the same end portion.

3. A balance as set forth in claim 1, further comprising a housing enclosing said link members and said second adjusting member, said housing being formed with a restricted aperture aligned with said second adjusting member for access of a manually operated tool to said second adjusting member, said housing preventing access to said first adjusting member.

4. A balance as set forth in claim 1, wherein said second motion transmitting means include a lever having a long arm and a short arm, said associated end portion being attached to said short arm, and connecting means connecting said long arm to said second adjusting member.

5. A balance as set forth in claim 4, further comprising pivot means securing said lever to said support assembly for movement about an axis intermediate said arms, said one link member having a portion of maximum flexibility spacedly adjacent said axis.

6. A balance as set forth in claim 5, wherein said second adjusting member is secured to said support assembly for threaded movement, and said connecting means include a wedge-shaped member moving in a linear path in response to said threaded movement of said second adjusting member and having a face obliquely inclined relative to said path at an angle of less than 45°, and engaging means engaging said oblique face for movement at right angles to said path in response to said threaded movement, said long arm being connected to said engaging means for movement thereby.

7. A balance as set forth in claim 6, further comprising a tension spring connecting said long arm and said wedge-shaped member.

8. A balance as set forth in claim 7, wherein said engaging means include a motion transmitting member abuttingly engaging said long arm and said obliquely inclined face.

9. A balance as set forth in claim 4, further comprising pivot means connecting said lever to said support assembly for movement about a pivot axis, a portion of said lever intermediate said arms being formed with two substantially V-shaped notches open in an upward direction, said pivot means including two axial pivot pins transverse to said arms and received in said notches respectively, and yieldably resilient means on said support biasing said portion of said lever upward toward said pivot pins.

10. A balance as set forth in claim 9, wherein said first motion transmitting means are operatively interposed between said first adjusting member and said pivot pins.

* * * * *